(12) United States Patent
Matsunaga et al.

(10) Patent No.: US 6,434,164 B1
(45) Date of Patent: Aug. 13, 2002

(54) MULTIPLE-ACCESS COMMUNICATION SYSTEM CAPABLE OF MEASURING AND GUARANTEEING A SERVICE QUALITY SUPPLIED FOR EACH SERVICE PERMITTED TO SUBSCRIBER STATIONS

(75) Inventors: Yasuhiko Matsunaga; Morihisa Momona, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/306,916

(22) Filed: May 7, 1999

(30) Foreign Application Priority Data

May 8, 1998 (JP) .......................................... 10-126159

(51) Int. Cl.[7] .............................................. H04B 7/212
(52) U.S. Cl. ....................................... 370/443; 370/468
(58) Field of Search ................................ 370/329, 337, 370/341, 347, 348, 431, 439, 438, 442, 443, 468, 489

(56) References Cited

U.S. PATENT DOCUMENTS 5,349,580 A * 9/1994 Hester et al. ............... 370/468
5,351,240 A * 9/1994 Highsmith .................. 370/468
5,548,579 A * 8/1996 Lebrum et al. ............. 370/468
5,966,163 A * 10/1999 Lin et al. .................... 370/468

* cited by examiner

Primary Examiner—Ajit Patel
(74) Attorney, Agent, or Firm—Whitham, Curtis & Christofferson, PC

(57) ABSTRACT

In a multiple-access communication system where a center station dynamically allocates upstream bandwidth to subscriber stations, upon receiving a reservation information from a subscriber station, the center station obtains an upstream resource usage information of a service corresponding to an identifier added to the reservation information from an upstream resource usage control means. When a value of a guaranteed upstream rate of the service is above a value of measured average upstream rate, an upstream bandwidth is allocated immediately upon receiving the reservation information. On the contrary, when the guaranteed value is below the measured average upstream rate value, the upstream bandwidth allocation to the reservation information is deferred, resulting in preventing degradation of service quality of other subscriber stations.

8 Claims, 14 Drawing Sheets

42

| IDENTIFIER (400) | GUARANTEED UPSTREAM RATE (410) | Priority (430) |
|---|---|---|
| 0001 | 16 kbps | 4 |
| 0002 | 64 kbps | 1 |
| 0003 | 32 kbps | 2 |
| ⋮ | ⋮ | ⋮ |

50

| IDENTIFIER (400) | AVERAGE UPSTREAM RATE MEASUREMENT VALUE (500) | BANDWIDTH ALLOCATED AFTER UPDATING A PREVIOUS MEASUREMENT VALUE (510) |
|---|---|---|
| 0001 | 9.6 kbps | 2048 bits |
| 0002 | 72.0 kbps | 7192 bits |
| 0003 | 21.2 kbps | 0 bit |
| ⋮ | ⋮ | ⋮ |

| RESERVATION INFORMATION QUEUE NUMBER | SUM OF REQUESTED UPSTREAM BANDWIDTH HELD IN THE QUEUE | UPPER LIMIT OF SUM OF REQUESTED UPSTREAM BANDWIDTH HELD IN THE QUEUE |
|---|---|---|
| 70 | 2400 bits | 16000 bits |
| 71 | 0 bits | 20000 bits |
| 72 | 9600 bits | 20000 bits |
| 73 | 12800 bits | 25000 bits |
| 74 | 0 bits | 20000 bits |
| 75 | 37600 bits | 50000 bits |

FIG. 14

MULTIPLE-ACCESS COMMUNICATION SYSTEM CAPABLE OF MEASURING AND GUARANTEEING A SERVICE QUALITY SUPPLIED FOR EACH SERVICE PERMITTED TO SUBSCRIBER STATIONS

BACKGROUND OF THE INVENTION

The present invention relates to a multiple-access communication system, such as a bidirectional CATV network, a passive optical star network and so forth for a center station to dynamically assign upstream bandwidth to subscriber stations, and in particular relates to a method of guaranteeing quality of service in the upstream channel.

A communication system, such as a bidirectional CATV network or a passive optical star network, generally has a broadcasting downstream channel from a center station to subscriber stations, and a time-division multiple-access upstream channel from subscriber stations to the center station. In a communication system like this, the center station assigns one or more identifiers to the subscriber station when a subscriber station begins an operation, and then the subscriber station transmits data to the center station. Procedures of upstream bandwidth allocation are detailed below.

First, the center station transmits reservation-permit information to the subscriber stations, and then the subscriber stations having an upstream data to transmit send reservation information comprising an identifier and a requested upstream bandwidth to the center station. If reservation information sent from multiple subscriber stations collides in the upstream channel, the center and subscriber stations resolve the collision so that the center station eventually receives all the reservation information correctly.

Also, when a subscriber station holds next data to send at time of data transmission, it transmits the current data with appending reservation information for the next data. The center station makes upstream-bandwidth-grant information from this reservation information and send it to the subscriber station, and the subscriber station sends the upstream data to the center station in the allocated upstream bandwidth. If the subscriber stations do not particularly require a service quality, the center station performs above-mentioned upstream bandwidth allocation procedure equally to all subscriber stations for each upstream data transmission.

Accordingly, when the upstream channel is congested in a communication system like this, collision of reservation information among subscriber stations and retention of reservation information in the center station may increase, resulting in an increase in a delay time required for upstream bandwidth allocation.

On the other hand, when a required upstream service quality such as guaranteed bandwidth or upper limit of transmission delay is already known, the quality of services in the upstream channel must be guaranteed. Examples of such services are real-time audio and video packet transmission.

Conventionally, as a first method to guarantee a service quality in a multiple-access communication system like this, there is one in which a subscriber station informs the center station of a required service quality before sending an upstream reservation information, and the center station, allocates upstream bandwidth at a periodic basis. As a second method to guarantee a service quality in a multiple-access communication system like this, there is one in which the center station periodically sends reservation-permit information to the subscriber station to allocate upstream bandwidth on priority basis to the subscriber station. As an example of reports about the first method of the prior art, there is James E. Dail et al., "IEEE Communication Magazine," pp. 104–112, March 1996. Also, as an example of reports about the second method of the prior art, Patent Application H10-18318 can be mentioned.

In case of the first method to guarantee service quality of the prior art, if a quantity of upstream data generated by a subscriber station temporarily exceeds an upstream bandwidth periodically allocated by the center station, the subscriber station may send reservation information in a normal procedure to request excess bandwidth and the center station receiving this allocates the excess upstream bandwidth if there is still some available.

Also, in case of the second method to guarantee service quality of the prior art, if a quantity of upstream data generated by a subscriber station temporarily exceeds the guaranteed upstream bandwidth, the subscriber station may request excess upstream bandwidth in response to the periodic reservation-permit information from the center station, and the center station receiving this allocates the excess upstream bandwidth if there is still some available.

Like this, in the method to guarantee service quality of the prior art in above-mentioned communication system, when the subscriber station attempts to send upstream data at a transmission rate higher than the guaranteed upstream rate, the center station has no means to defer upstream bandwidth allocation. Accordingly, if a certain subscriber station sends upstream data at a rate far above a guaranteed upstream rate, upstream bandwidth allocation to other subscriber stations is delayed due to the lack of limiting upstream bandwidth allocation to the guaranteed rate, resulting in a degradation of service quality supplied to other subscriber stations.

Further, in a method to guarantee service quality of the prior art, the time required for queuing-reservation information at the center station cannot be guaranteed. Particularly, when the center station periodically sends reservation-permit information to subscriber stations by the conventional method, the time between the reception of reservation information and the upstream bandwidth allocation at the center station is not bounded. Accordingly, there is a problem that the service quality cannot be guaranteed if queuing delay at the center station becomes long.

SUMMARY OF THE INVENTION

It is therefore an object of the present invention, in a multiple-access communication system, such as a bidirectional CATV network, a passive optical star network and so forth where a center station dynamically allocates bandwidths of an upstream channel to subscriber stations, to measure and guarantee a service quality supplied for each service permitted to subscriber stations and prevent a degradation in service quality for other subscriber stations due to an influence of a subscriber station that sends data exceeding a previously contracted guaranteed value of a service quality.

Other objects of the present invention will become clear as the description proceeds.

A multiple-access communication system of a first invention wherein the center station has means for permitting the use of services of different qualities which it guarantees to subscriber stations; means for assigning identifiers corresponding to each service to the subscriber stations; means for transmitting reservation-permit information to the subscriber stations; means for receiving reservation information from the subscriber stations; means for measuring an upstream service quality being supplied with regard to a service corresponding to an identifier that is added to a reservation information when receiving the reservation information from a subscriber station; means for comparing the measured upstream service quality with a guaranteed value of a previously assigned service quality; means for immediately accepting the reservation information, if the measured value is below the guaranteed value, and assigning an upstream bandwidth; and means for accepting a reservation information of other subscriber stations prior to accepting the received reservation information, if the measured value is above the guaranteed-value, so as to prevent degradation of service quality to the other subscriber stations.

Also, wherein a subscriber station has means for requesting the use of services to the center station; means for receiving identifiers assigned by the center station according to each requested services; means for receiving a reservation-permit information from the center station; means for transmitting a reservation information to the center station in an upstream bandwidth designated by the reservation-permit information; means for adding an identifier corresponding to a service type of an upstream data to be sent to the reservation information; means for receiving an upstream-bandwidth-grant information from the center station; and means for transmitting the upstream data to the center station in the upstream bandwidth designated by the upstream-bandwidth-grant information.

A multiple-access communication system of a second invention, as claimed in the first invention, wherein the center station has means for holding a scheduled allocation time information determined from a guaranteed service quality and an guaranteed upstream bandwidth and for holding a permissible fluctuation quantity information of an allocation time when a current allocation time is earlier than a scheduled allocation time, for each service the center station permitted to subscriber stations; means for comparing a current allocation time with a scheduled allocation time when the center station receives a reservation information from a subscriber station; means for immediately accepting a reservation information if the current allocation time is later than the scheduled allocation time, or if the current allocation time is earlier than the scheduled allocation time but later than a time adding a permissible fluctuation quantity of the allocation time to the scheduled allocation time; and means for accepting a reservation information of other subscriber stations prior to accepting the received reservation information, so as to prevent degradation of a service quality to the other subscriber stations, if the current allocation time is earlier than the time adding the permissible fluctuation quantity of the allocation time to the scheduled allocation time.

A multiple-access communication system of a third invention as claimed in the second inventions wherein supposing that an upstream rate guaranteed to a subscriber station is g bits/sec, a permissible fluctuation quantity of an allocation time is Tb seconds and a requested upstream bandwidth of a reservation information which the center station received from the subscriber station is B bits, the center station has means for immediately accepting a reservation information and updating a scheduled allocation time to a value adding (B/g) seconds to a current allocation time if the current allocation time is later than the scheduled allocation time, or for immediately accepting the reservation information and updating the scheduled allocation time to a value adding (B/g) seconds to the scheduled allocation time if the current allocation time is earlier than the scheduled allocation time but later than a time adding Tb to the scheduled allocation time, and further, for accepting a reservation information of other subscriber stations prior to accepting the received reservation information, if the current allocation time is earlier than the time adding Tb to the scheduled allocation time, so as to prevent degradation of service quality to the other subscriber station.

A multiple-access communication system of a fourth invention, as claimed in the first invention, wherein the center station has means for holding statistical values of an upstream service quality measured in the past for each service permitted to subscriber stations; means for updating, when measuring an upstream service quality, a statistical value of the upstream service quality from statistical values of the upstream service quality measured in the past and temporary values of the upstream service quality measured up to the present after updating a previous statistical value; means for immediately accepting a reservation information and assigning an upstream bandwidth if the statistical value of the upstream service quality is below a guaranteed value of a previously assigned service quality when receiving an upstream reservation information; and means for accepting a reservation information of another subscriber station prior to accepting the received reservation information, so as to prevent degradation of service quality to the other subscriber stations, if the statistical value of the upstream service quality exceeds the guaranteed value of service quality.

A multiple-access communication system of a fifth invention as claimed in the fourth invention, supposing that an interval of measuring an upstream service quality being supplied by the center station for each service is Ti seconds, an upstream rate guaranteed to a subscriber station is g bits/sec, a statistical value of an average upstream rate for an upstream service is m bits/sec, a temporary upstream rate up to the present after updating a previous statistical value is r bits/sec, and a weighting average index is w, w being values between 0 and 1, means for updating a value of the statistical value m of upstream rate to $w*r+(1-w)*m$ when the center station measures the upstream service quality; means for immediately accepting a reservation information and assigning an upstream bandwidth if m is below g when receiving an upstream reservation information; and means for accepting a reservation information of other subscriber stations prior to accepting the received reservation information if m is above g, so as to prevent degradation of service quality to the other subscriber stations.

A multiple-access communication system of a sixth invention as claimed in the first, second, third, fourth or fifth invention, wherein the center station and a subscriber station have means for dividing an upstream bandwidth into slots of ten and some bytes and up to some ten bytes; and means for making reservation of and allocating an upstream bandwidth in a unit of said slot.

A multiple-access communication system of a seventh invention, as claimed in the first, second, third, fourth, fifth or sixth invention, wherein the center station has means for assigning a priority for each service permitted to subscriber stations; queues for temporarily holding reservation information received for each priority; means for inserting a reservation information to the tail of a queue of a priority corresponding to an identifier appended to a reservation information when receiving the reservation information; means for removing a reservation information from the head of a queue of a highest priority when allocating an upstream bandwidth; means for comparing a measured value of a service quality corresponding to an identifier of the removed reservation information with a guaranteed value of a previously assigned service quality; means for immediately accepting a reservation and allocating an upstream bandwidth if the measured value is below the guaranteed value; and means for inserting a reservation information to the tail of a queue of a lower priority, if the measured value is above the guaranteed value, so as to prevent degradation of service quality to otter subscriber stations.

A multiple-access communication system of an eighth invention as claimed in the seventh invention, wherein the center station has means for holding the sum of requested upstream bandwidths contained in each reservation information for a queue of each priority; means for receiving a reservation information from subscriber stations; means for adding an requested upstream bandwidth contained in the received reservation information to the current sum of requested upstream bandwidth; means for inserting the received reservation information to a queue corresponding to a priority if the result is below a previously set upper limit of the sum of requested upstream bandwidth which each queue can hold; and means for inserting the received reservation information to a queue of a lower priority if the result exceeds the upper limit.

In a multiple-access communication system of a first invention, first of all, when a subscriber station requests a guarantee for quality of an upstream services it sends a service-quality-request information of each service to a center station. This service-quality-request information contains a peak rate, average rate, maximum burst length, maximum delay and so forth of traffic. When the center station can offer the service quality requested from the subscriber station, it assigns an identifier to the subscriber station. Also in the center station, a guaranteed service quality and a measured value of an upstream service quality being supplied are controlled for each service permitted to the subscriber station.

When the subscriber station send an upstream data, first, when receiving a reservation-permit information from the center station, the subscriber station sends a reservation information made up of an identifier corresponding to a service for the upstream data and a requested upstream bandwidth to the center station. The center station, upon receiving the reservation information from the subscriber station, compares a guaranteed upstream service quality corresponding to the identifier contained in the reservation information and a measured value of an upstream service quality being offered. After comparing, if the measured value of the service quality is below the guaranteed value, the center station immediately accept the reservation information and allocates an upstream bandwidth, or if the measured value is above the guaranteed value, the center station accepts a reservation information from other subscriber stations prior to accepting the received reservation information.

Thus, it is possible to prevent a degradation in service quality for other subscriber stations due to an influence of a subscriber station that sends data exceeding a transmission rate or burst length of a previously assigned guaranteed value of a service quality.

In a multiple-access communication system of a second invention as claimed in the multiple-access communication system of the first invention, the center station holds, for each service it permitted to subscriber stations, a scheduled allocation time information determined from a guaranteed service quality and an allocated upstream bandwidth, and a permissible fluctuation quantity information of an allocation time when a current allocation time is earlier than a scheduled allocation time.

The center station, upon receiving said reservation information from the subscriber station, compares the scheduled allocation time of a service corresponding to an identifier appended to the reservation information and the current allocation time. After comparing, if the current allocation time is later than the scheduled allocation time, or if the current allocation time is earlier than the scheduled allocation time but later than a time adding a permissible fluctuation quantity of the allocation time to the scheduled allocation time, the center station immediately accepts the reservation information. On the other hand, if the current allocation time is earlier than the time adding the permissible fluctuation quantity of the allocation time to the scheduled allocation time, the center station accepts a reservation information of other subscriber stations prior to accepting the received reservation information.

Like this, at the center station, whether or not a subscriber station is sending an upstream data exceeding a previously assigned guaranteed service quality can easily be controlled by comparing a scheduled allocation time of an upstream bandwidth for each service with a current allocation time.

In a multiple-access communication system of a third invention as claimed in the multiple-access communication system of the second invention, supposing that an upstream rate which the center station guarantees a subscriber station is g bits/sec, a permissible fluctuation quantity of an allocation time is Tb seconds and a requested upstream bandwidth of a reservation information which the center station receives from the subscriber station is B bit, if the current allocation time is later than the scheduled allocation time, the center station immediately accepts the reservation information and updates the scheduled allocation time to a value adding (B/g) seconds to the current allocation time. If the current allocation time is earlier than the scheduled allocation time but later than a time adding Tb to the scheduled allocation time, the center station immediately accepts the reservation information and updates the scheduled allocation time to a value adding (B/g) seconds to the scheduled allocation time. Further, if the current allocation time is earlier than the time adding Tb to the scheduled allocation time, the center station accepts a reservation information of other subscriber stations prior to accepting the received reservation information.

Like this, by the center station deciding updating of a scheduled allocation time and a method of accepting reservation information by comparing a current allocation time with the scheduled allocation time, it is possible to immediately accept a reservation information while a subscriber station is performing transmission within a guaranteed upstream rate or by temporarily exceeding the upstream rate, and if the subscriber station continuously exceeds a guaranteed upstream rate, it is possible to accept a reservation information of other subscriber stations prior to accepting the received reservation information.

In a multiple-access communication system of a fourth invention as claimed in the multiple-access communication system of the first invention, the center station holds a statistical value of an upstream service quality measured in the past for each service permitted to subscriber stations. When measuring an upstream service quality being supplied to a subscriber station, the center station takes a weighting average of statistical values of the service quality and temporary values of service quality measured up to the present after updating a previous statistical value and updates the statistical value of the upstream service quality.

The center station, if the statistical value of service quality is below a guaranteed value of a previously assigned service quality when receiving an upstream reservation information, immediately accepts the reservation information and allocates an upstream bandwidth, and if the statistical value exceeds the guaranteed value of service quality, the center station accepts a reservation information of other subscriber stations prior to the received reservation information, so as to prevent degradation of service quality to the other subscriber stations.

Like this, by taking statistics of a measured upstream service quality, it is possible to guarantee an upstream service quality without immediately delaying acceptance of a reservation even when the upstream service quality frequently exceeds a guaranteed value due to sudden fluctuations in traffic.

In a multiple-access communication system of a fifth invention as claimed in the multiple-access communication system of the fourth invention, it is supposed that an interval of measuring a service quality being supplied by the center station for each service is Ti seconds, an upstream rate guaranteed to said subscriber station is g bits/sec, a statistical value of an average upstream rate for an upstream service is m bits/sec, a temporary upstream rate up to the present after updating a previous statistical value is r bits/sec, and a weighting average index is w, w being values between 0 and 1. The center station, when measuring an upstream service quality, updates a value of the statistical value m of upstream rate to $w*r+(1-w)*m$. If m is below g when receiving an upstream reservation information, the center station immediately accepts the reservation information and allocates an upstream bandwidth, and if m is above g, the center station accepts reservation information of other subscriber stations prior to the received reservation information, so as to prevent degradation of service quality to the other subscriber stations.

Like this, by taking statistics of an average upstream rate for an upstream service via a weighted average, it is possible to guarantee an upstream service quality without immediately delaying acceptance of a reservation even when the upstream service quality frequently exceeds a guaranteed value due to sudden fluctuations in traffic.

In a multiple-access communication system of a sixth invention as claimed in the multiple-access communication system of the fifth invention, the center station and a subscriber station divide an upstream channel into slots of ten and some bytes and up to some ten bytes, make reservation and allocate upstream bandwidth in a unit of slot. Like this, by dividing an upstream channel in a slot unit, it is possible to easily assign an upstream bandwidth and measure an upstream service quality.

In a multiple-access communication system of a seventh invention as claimed in the multiple-access communication system of the first, second, third, fourth, fifth or sixth invention, the center station assigns an identifier and a priority for each service it permitted to subscriber stations. The center station internally manages a service quality guaranteed for each service, a priority of service and an upstream service quality being offered. The center station has queues to temporarily hold reservation information received for each priority, and, when receiving a reservation information from a subscriber station, the center station inserts a reservation information to the tail of a queue of a priority corresponding to an identifier appended to the reservation information.

The center station, when assigning an upstream bandwidth, removes a reservation information from the head of a queue of a highest priority. The center station measures a service quality being offered corresponding to an identifier of the removed reservation information and compares the measured service quality with a value of a previously assigned guaranteed service quality. If the measured value is below the guaranteed value, the center station immediately accepts the reservation and allocates an upstream bandwidth, and if the measured value is above the guaranteed value, the center station inserts the reservation information to the tail of a queue of a lower priority Like this, by the center station having a queue corresponding to a priority for temporarily holding a reservation information, it is possible to accept a reservation of other subscriber stations prior to accepting a reservation information of a subscriber station that sends an upstream data exceeding a service quality, so as to prevent degradation of service quality to the other subscriber station.

In a multiple-access communication system of an eighth invention as claimed in the multiple-access communication system of the seventh invention, the center station holds the sum of requested upstream bandwidth contained in each reservation information for a queue of each priority. The center station, receiving a reservation information from a subscriber station, adds a requested upstream bandwidth contained in the received reservation information to the current sum of requested upstream bandwidth. If the result is below a previously set upper limit of the sum of requested upstream bandwidths which the queue can hold, the center station inserts the received reservation information to a queue corresponding to a priority, and if the result exceeds the upper limit, the center station inserts it to a queue of a lower priority.

Like this, by holding the sum of requested upstream bandwidth of reservation information contained in a queue of each priority and by inserting a reservation information to a queue via comparison with a previously set upper limit, it is possible to guarantee an upper limit of a delay time required for queuing for each priority.

BRIEF DESCRIPTION OF THE DRAWINGS

FIG. 12 shows upstream resource usage control means 12m in the fourth embodiment;

FIG. 14 shows a configuration of requested bandwidth quantity control means 80 in the fourth embodiment.

DETAILED DESCRIPTION OF THE PREFERRED EMBODIMENTS

Next, referring to FIGS. 1 through 6, description will proceed to a multiple-access communication system according to a first embodiment of the present invention.

Figure 1:
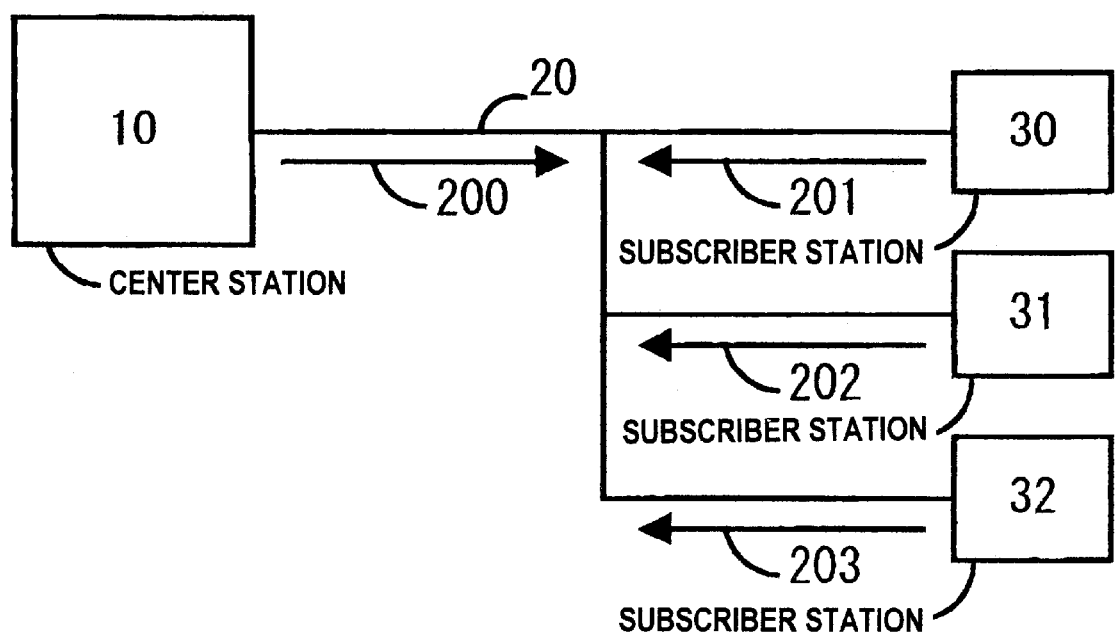
FIG. 1 is a connection diagram of a center station 10, a transmission path 20 and subscriber stations 30, 31 and 32 in a multiple-access communication system of a first embodiment of the present invention.

FIG. 1 is a connection diagram of a center station 10, a transmission path 20, and subscriber stations 30, 31 and 32 in a multiple-access communication system of a first embodiment of the present invention. The center station 10 and the subscriber stations 30, 31 and 32 are connected via the transmission path 20. A downstream signal 200 sent from the center station is transmitted via a broadcasting channel to the subscriber stations 30, 31 and 32. Also, upstream signals 201, 202 and 203 sent from the subscriber stations 30, 31 and 32 are transmitted via a multiple-access channel to the center station.

Figure 2:
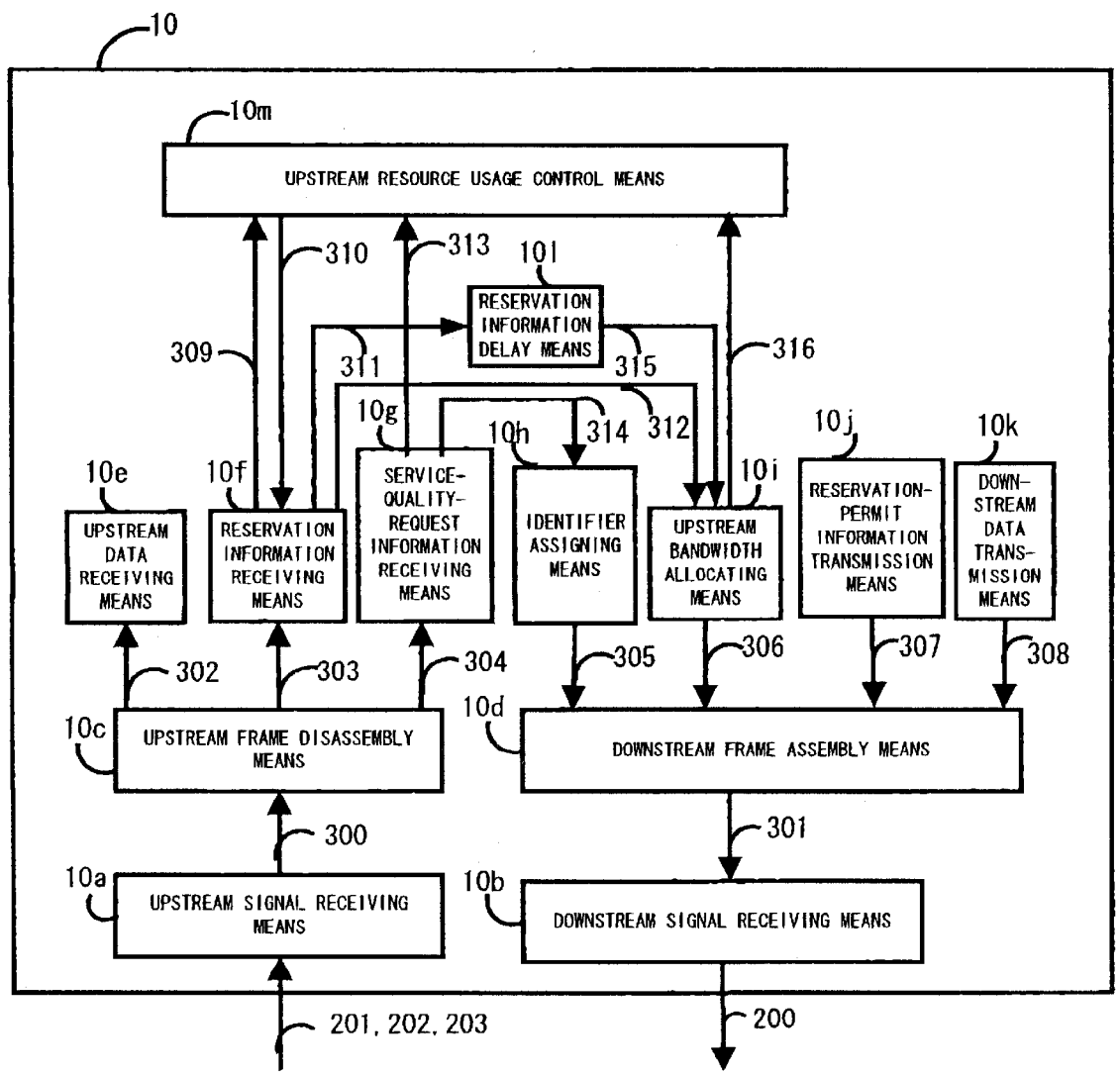
FIG. 2 shows a configuration of the center station 10 of the first embodiment.

FIG. 2 shows a configuration of the center station 10 of the first embodiment of the present invention. The center station 10 is formed with upstream signal receiving means 10a, downstream signal transmission means 10b, upstream frame disassembly means 10c, down frame assembly means 10d, upstream data receiving means 10e, reservation information receiving means 10f, service-quality-request information receiving means 10g, identifier assigning means 10h, upstream bandwidth allocating means 10i, reservation-permit information transmission means 10j, downstream data transmission means 10k, reservation information delay means 10l and upstream resource usage control means 10m.

The upstream signal receiving means 10a receives upstream signals 201, 202 and 203 inputted from an upstream multiple-access channel and outputs a demodulated upstream frame 300 to the upstream frame disassembly means 10c.

The upstream frame disassembly means 10c disassembles the upstream frame 300 and outputs an upstream data 302 to the upstream data receiving means 10e, a reservation information 303 to the reservation information receiving means 10f, and a service-quality-request information 304 to the service-quality-request information receiving means 10g. The upstream data receiving means 10e performs a receiving processing of the upstream data 302.

The reservation information receiving means 10f searches a content of the upstream resource usage control means 10m based on an identifier information 309 added to an inputted reservation information and obtains a corresponding upstream resource use rate information 310. The reservation information receiving means 10f, if a resource usage does not exceed an contracted value in the upstream resource usage information 310, outputs a reservation information 312 to the upstream bandwidth allocating means 10i and immediately allocates an upstream bandwidth. On the other hand, if the resource usage exceeds the contracted value in the upstream resource usage information 310, it outputs a reservation information 311 to the reservation information delay means 10l and defers allocation of the upstream bandwidth.

The service-quality-request information receiving means 10g judges whether or not to accept a request in response to an inputted service-quality-request information 304 and, if accepted, it assigns an identifier information 314 and outputs the same to the identifier information transmission means 10h. Also, it registers a contracted service quality value information 313 made up with an identifier and a service quality information by outputting the same to the upstream resource usage control means 10m.

The reservation information delay means 10l delays the reservation information 311, that is inputted from the reservation information receiving means 10f and exceeds the contracted value, and outputs a reservation information 315 to the upstream bandwidth allocating means 10i.

The upstream resource usage control means 10m stores the contracted service quality value information 313 and an upstream resource usage measurement information 316 for each service. The identifier assigning means 10h generates an identifier assignment information 305 so as to assign the inputted identifier information 314 to a subscriber station and outputs the same to the downstream frame assembly means 10d.

The upstream bandwidth allocating means 10i allocates an upstream bandwidth to the subscriber station based on the inputted reservation information 312 and 315 and outputs the upstream-bandwidth-grant information 306 to the downstream frame assembly means 10d. Also, the upstream bandwidth allocating means 10i, based on the assigned upstream bandwidth, outputs the upstream resource usage measurement information 316 to the upstream resource usage control means 10m.

The reservation-permit information transmission means 10j outputs a reservation-permit information 307 to the downstream frame assembly means 10d to collect reservation information. The downstream data transmission means 10k performs transmission processing of downstream data and outputs a downstream data 308 to the downstream frame assembly means 10d.

The downstream frame assembly means 10d, assembles the inputted identifier assignment information 305, upstream-bandwidth-grant information 306, reservation-permit information 307 and downstream data 308 and converts these to a downstream frame 301 and outputs it to the downstream signal transmission means 10b. The downstream signal transmission deans 10b modulates the inputted downstream frame 301 and outputs a downstream signal 200 to a downstream broadcasting channel.

Figure 3:
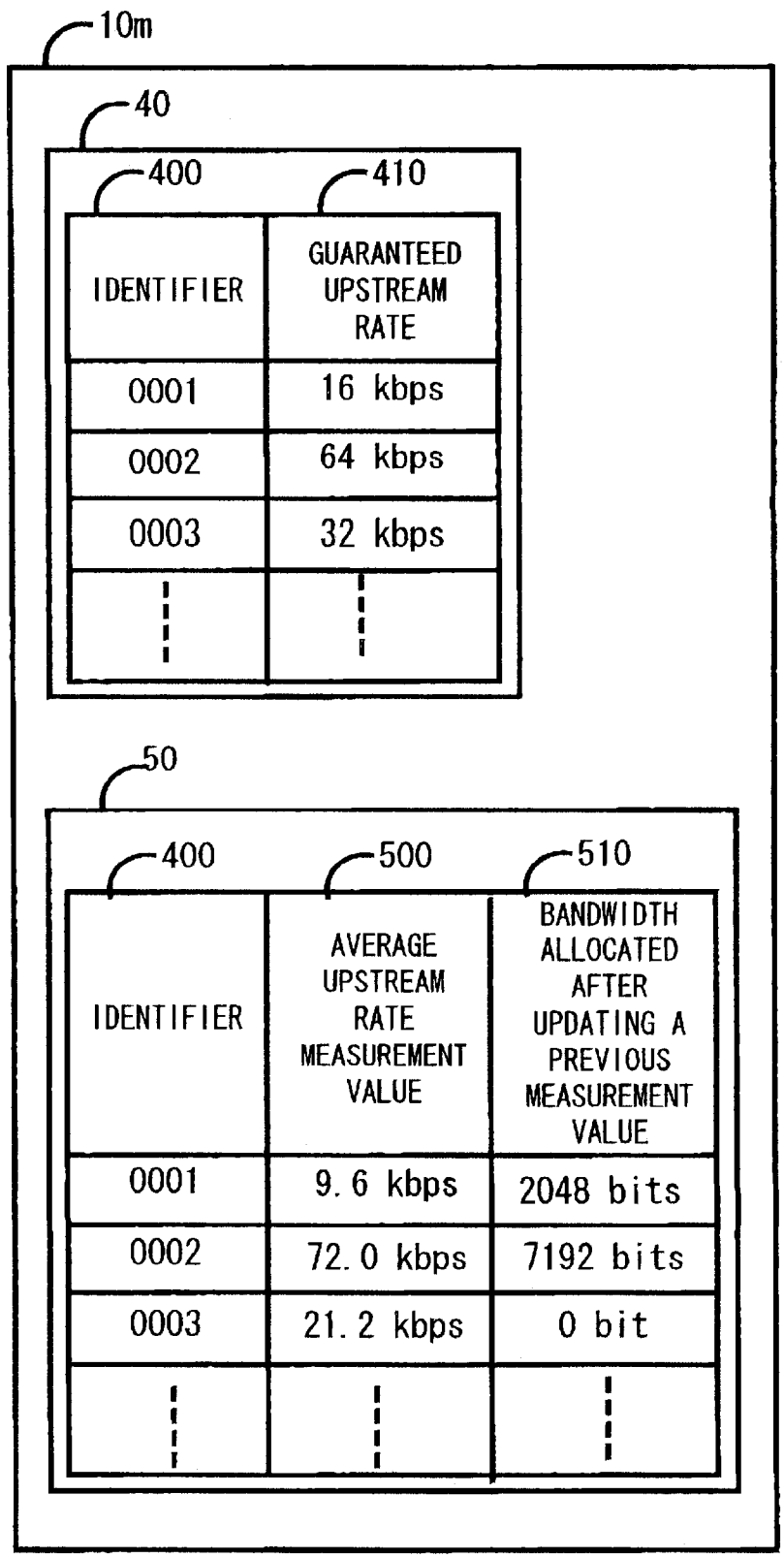
FIG. 3 shows a configuration of upstream resource usage control means 10m in the center station 10 of the first embodiment.

FIG. 3 shows a configuration of the upstream resource usage control means 10m in the center station 10 of the first embodiment of the present invention. The upstream resource usage control means 10m is formed with contracted service quality value memory means 40 and service quality measurement value memory means 50.

The contracted service quality value memory means 40 stores an identifier 400 and a guaranteed upstream rate 410 for each service. Also the service quality measurement value memory means 50 stores an identifier 400, an average upstream rate measurement value 500, a bandwidth allocated after updating a previous measurement value 510. The upstream resource usage control means 10m, upon inputting the contracted service quality value information 313 from the service-quality-request information receiving means 10g, sets a corresponding item of the contracted service quality value memory means 40.

Also, the upstream resource usage control means 10m, upon inputting the upstream resource usage measurement information 316 from the upstream bandwidth allocating means 10i, updates a corresponding item of the service quality measurement value memory means 50.

Figure 4:
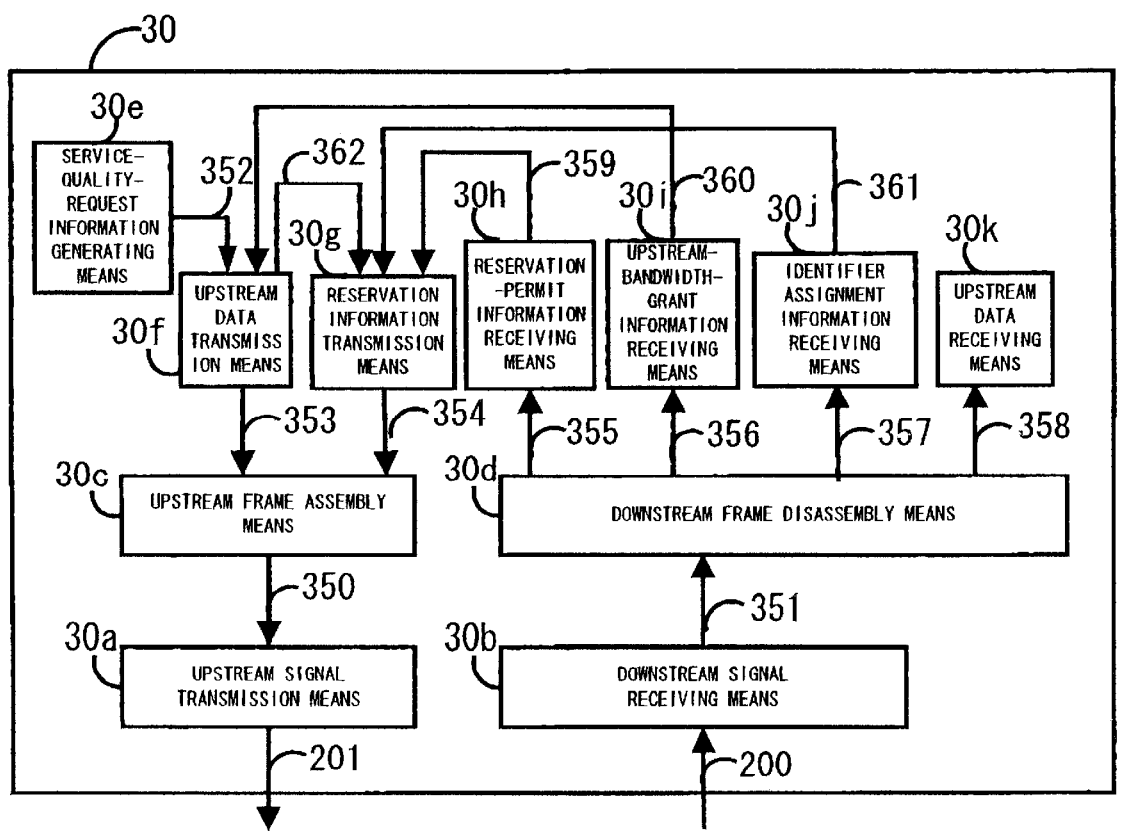
FIG. 4 shows a configuration of a subscriber station 30 in the first embodiment.

FIG. 4 shows a configuration of a subscriber station 30 in the first embodiment of the-present invention. The subscriber station 30 is formed with upstream signal transmission means 30a, downstream signal receiving means 30b, upstream frame assembly means 30c, downstream frame disassembly means 30d, service-quality-request information generating means 30e, upstream data transmission means 30f, reservation information transmission means 30g, reservation-permit information receiving means 30h, upstream-bandwidth-grant information receiving means 30i, identifier assignment information receiving means 30j and upstream data receiving means 30k.

The downstream signal receiving means 30b receives a downstream signal 200 inputted from a downstream channel and outputs a demodulated-downstream frame 351 to the downstream frame disassembly means 30d. The downstream frame disassembly means 30d extracts a reservation-permit information 355, an upstream-bandwidth-grant information 356, an identifier assignment information 357 and a downstream data 358 from the downstream frame and outputs each to the reservation-permit information receiving means 30h, the upstream-bandwidth-grant information receiving means 30i, the identifier assignment information receiving means 30j and the upstream data receiving means 30k, respectively.

The reservation-permit information receiving means 30h, if the inputted reservation-permit information 355 is addressed to the subscriber station 30, outputs a reservation-permit information 359 to the reservation information transmission means 30g, or otherwise discards the reservation-permit information 355. The upstream-bandwidth-grant information receiving means 30i, if the inputted upstream-bandwidth-grant information 356 is addressed to the subscriber station 30, outputs an upstream data transmission request information 360 to the upstream data transmission means 30f, or otherwise discards the inputted upstream-bandwidth-grant information 356. The identifier assignment information receiving means 30j, if the inputted identifier assignment information 357 is addressed to the subscriber station 30, outputs an identifier information 361 formed with a service quality information corresponding to the reservation information transmission means 30g, or otherwise discards the identifier assignment information 357. The upstream data receiving means 30k, if the inputted downstream data 358 is addressed to the subscriber station 30, performs a receiving processing of it, or otherwise discards the same.

The service-quality-request information generating means 30e, when a subscriber station 30e request a quality guarantee for a service it uses, generates a service-quality-request information 352 for each service and outputs it to the upstream data transmission means 30f. The upstream data transmission means 30f holds an ordinary data or the service-quality-request information 352 and outputs a reservation request information 362 formed with a data quantity to send next and its service type to the reservation information transmission means 30g. Also, the upstream data transmission means 30f, upon inputting the upstream data transmission request information 360, outputs an upstream data 353 to the upstream frame assembly means 30c.

The reservation information transmission means 30g, when the reservation-permit information 359 is inputted and if the reservation request information 362 is inputted, calculates an upstream reservation quantity and adds an identifier corresponding to the service type, and outputs a reservation information to the upstream frame assembly means 30c.

The upstream frame assembly means 30c converts the inputted upstream data 353 and reservation information 354 to an upstream frame, and outputs an upstream frame 350 to the upstream signal transmission means 30a. The upstream signal transmission means 30a modulate the inputted upstream frame 350 and outputs the upstream signal 201 to the upstream multiple-access channel.

Figure 5:
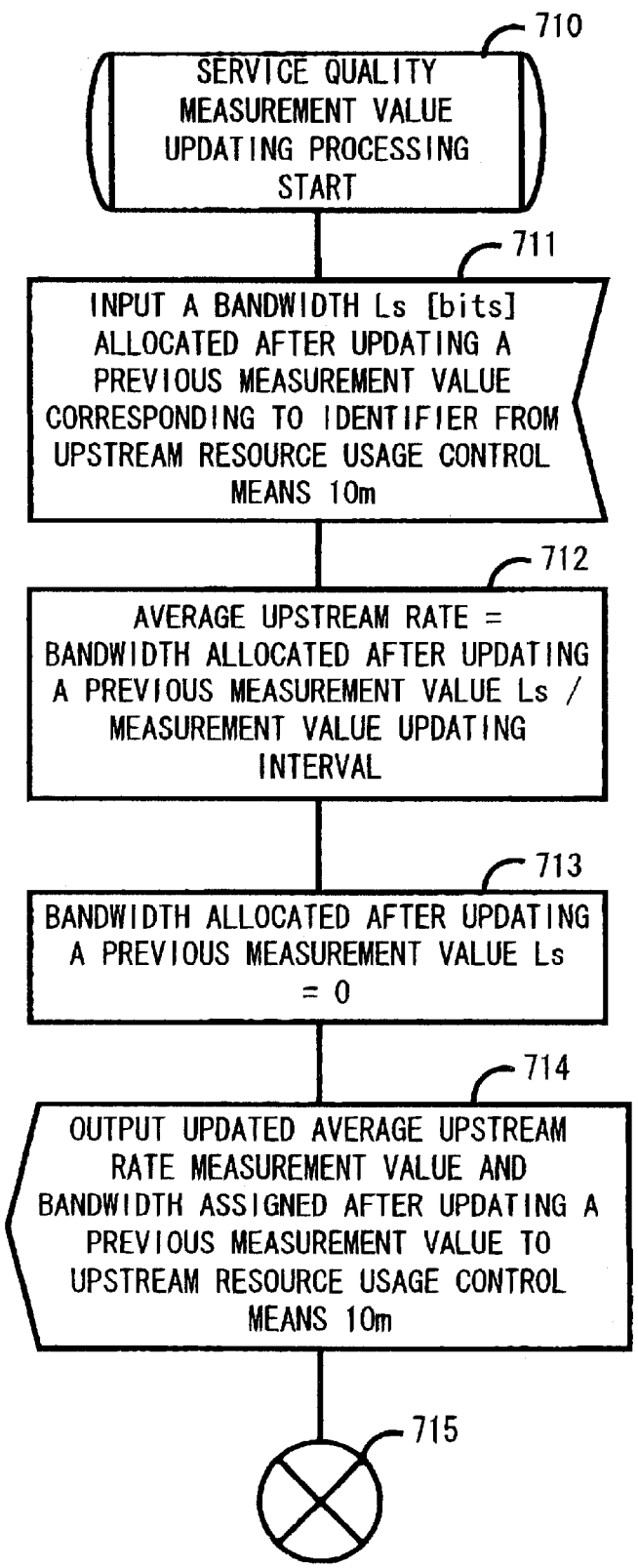
FIG. 5 shows a flowchart of reservation information receiving processing in reservation information receiving means 10f of the first embodiment.

FIG. 5 shows a flowchart of reservation information receiving processing in the reservation information receiving means 10f of the multiple-access communication method or system of the first embodiment of the present invention.

When a receiving processing begins (700), the reservation information receiving means 10f, upon receiving a reservation information from the upstream frame disassembly means 10c (701), obtains an upstream resource usage information of a service corresponding to an identifier contained in the reservation information from the upstream resource usage control means 10m (702). As a result, if a value of a guaranteed upstream rate corresponding to the identifier is above a measured average upstream rate value (True of 703), outputs the received reservation information to the upstream bandwidth allocating means 10i (704). On the other hand, if the value of the guaranteed upstream rate is below the measured average upstream value (False of 703), it outputs the reservation information to reservation information delay means 10l (705).

Like this, an upstream bandwidth is allocated, immediately upon accepting a reservation, to a subscriber station that sends upstream data within a guaranteed rate, and for a subscriber station that send upstream data exceeding a guaranteed rate, allocation of an upstream bandwidth is deferred. Thus, it is possible to prevent a degradation in service quality for other subscriber stations that send upstream data at a rate within a guaranteed rate due to an influence of a subscriber station that sends data exceeding a guaranteed rate.

Figure 6:
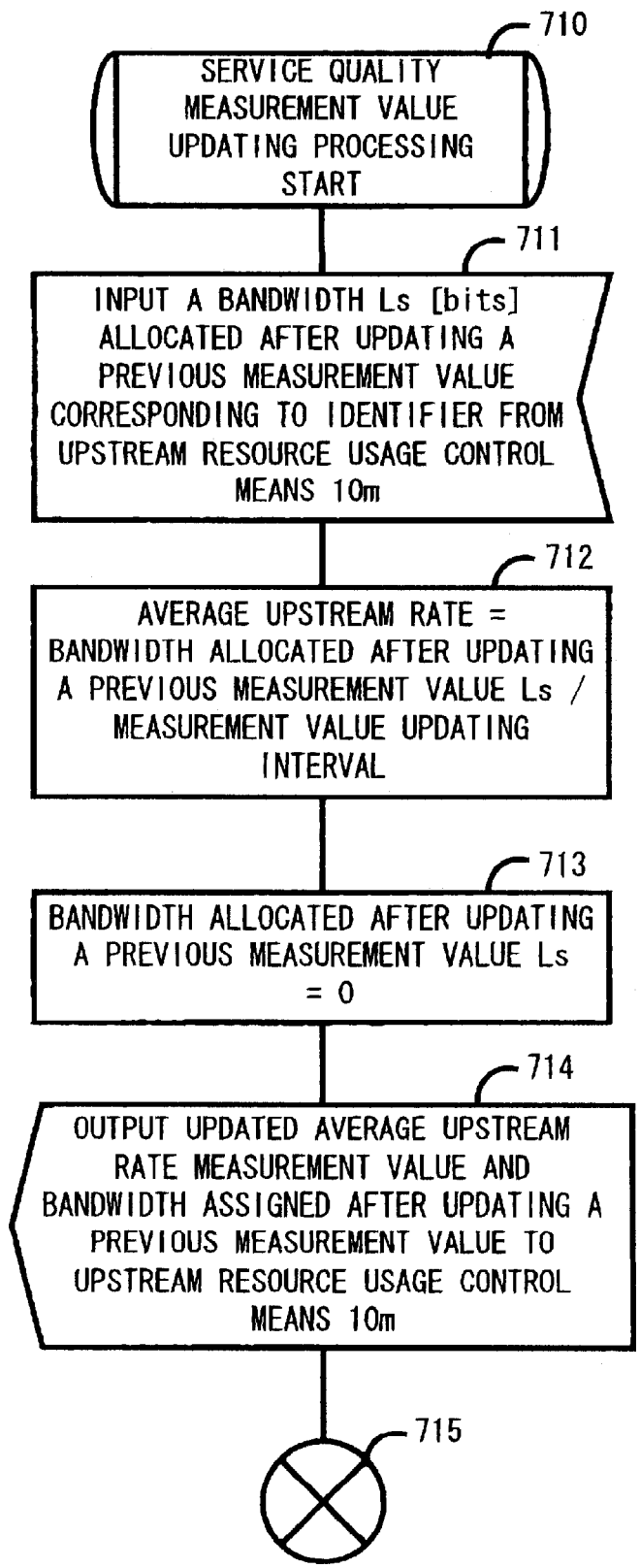
FIG. 6 shows a service quality measurement value updating process of upstream resource usage control means 10m performed by upstream bandwidth allocating means 10i in the first embodiment.

FIG. 6 shows a service quality measurement value updating process of the upstream resource usage control means 10m performed by the upstream bandwidth allocating means 10i in the first embodiment of the present invention.

First, the upstream bandwidth allocating means 10i inputs a bandwidth allocated after updating a previous measurement value Ls [bits] of a service corresponding to an identifier (711). Also, the upstream bandwidth allocating means 10i internally controls a measurement value updating interval Ti. The upstream bandwidth allocating means calculates an average upstream rate m [bps] up to the present after updating a previous measurement value from these values, as $$m = Ls/Ti$$

and updates the same (712).

Next, the upstream bandwidth allocating means updates the bandwidth allocated after updating a previous measurement value Ls to 0 (713) and a time updating a previous measurement value Ts to a current time, and outputs these to the upstream resource usage control means 10m together with an average upstream rate measurement value (714). By regularly doing this operation for all the services for which a service quality is guaranteed, it is possible to control an upstream resource usage for each service.

Figure 7:
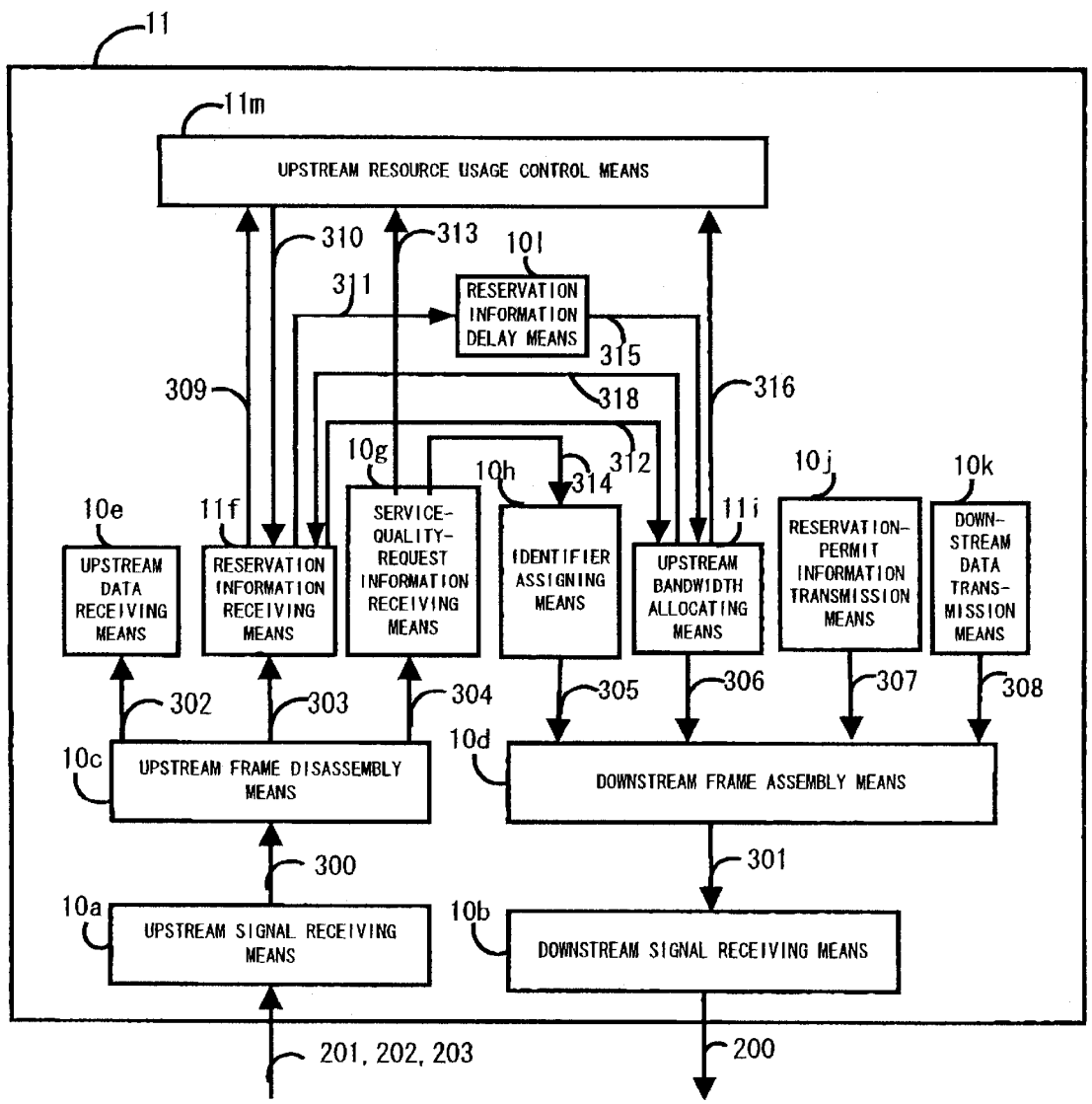
FIG. 7 is a configuration of a center station 11 of the second embodiment of the present invention.
Figure 8:
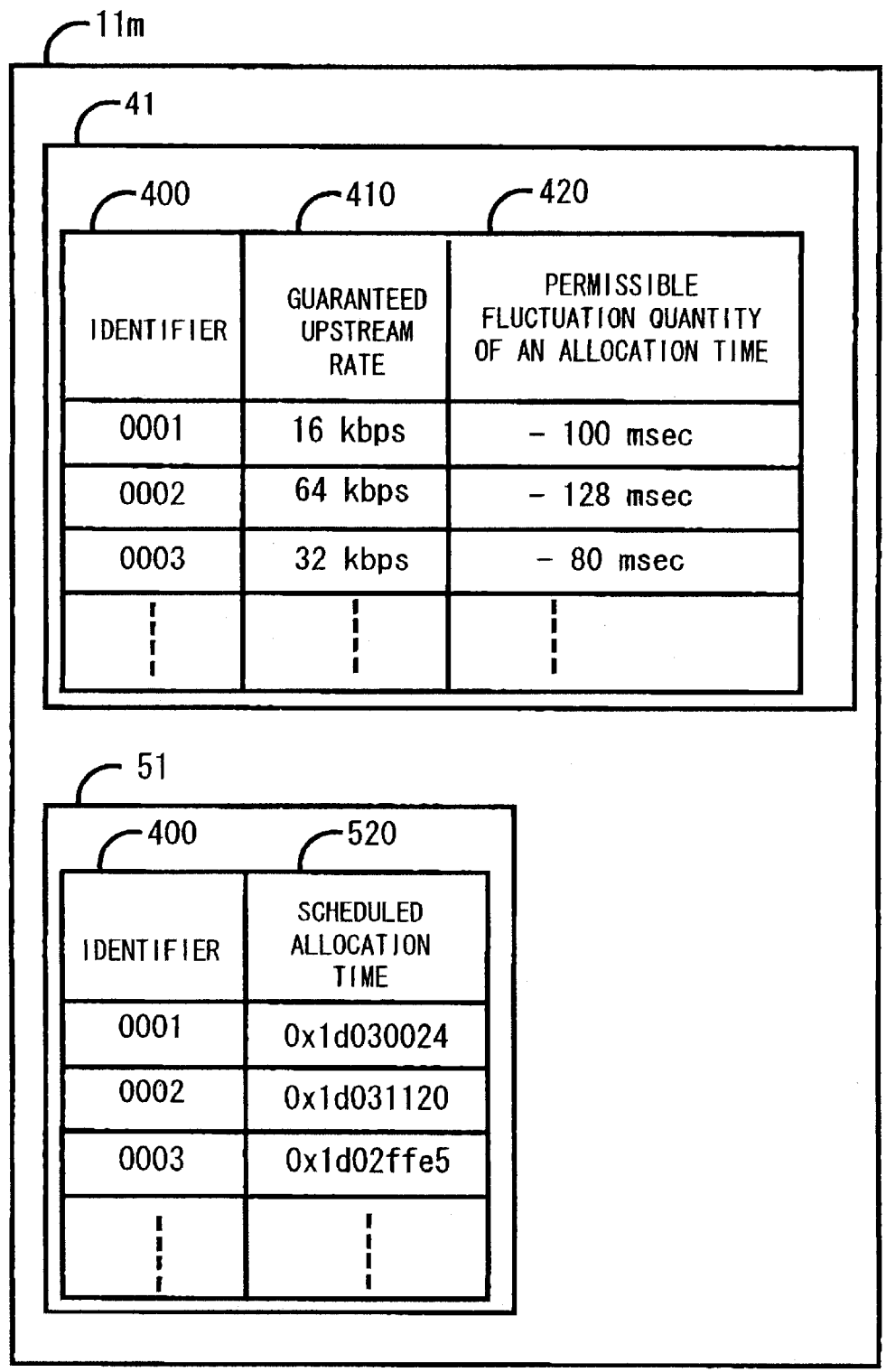
FIG. 8 shows a configuration of upstream resource usage control means 11m of the center station 11 of the second embodiment.
Figure 9:
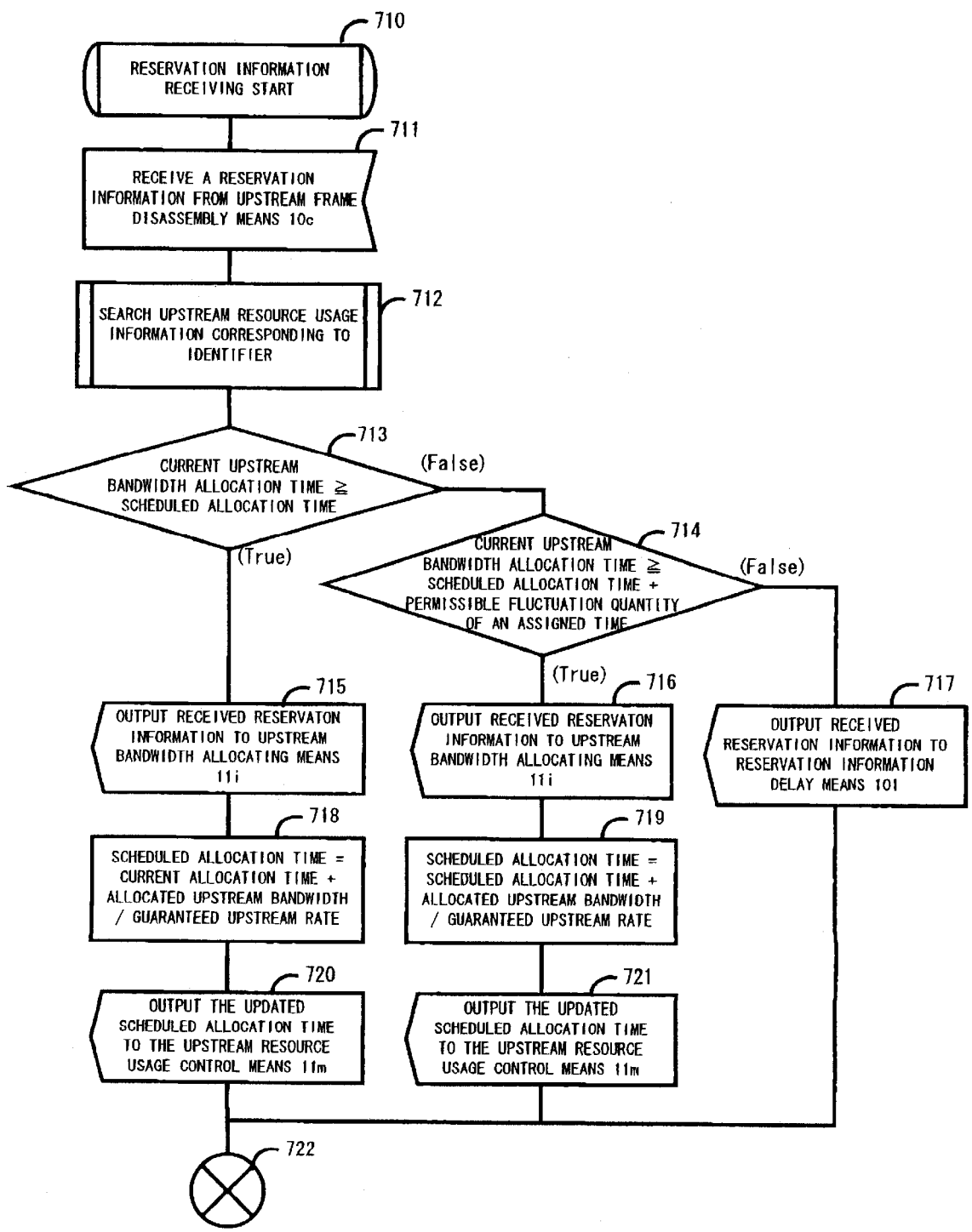
FIG. 9 shows a flowchart of a reservation information receiving processing in reservation information receiving means 10f of the second embodiment.

Referring now to FIGS. 7 through 9, description will proceed to a second embodiment of the present invention. FIG. 7 is a configuration of a center station 11 of the second embodiment of the present invention.

Reservation information receiving means 11f of a center station 11, upon receiving a reservation information from a subscriber station, inputs an scheduled allocation time information 317 of a service corresponding to an identifier added to the reservation information from upstream resource usage control means 11m, and inputs a current allocation time information 318 from upstream bandwidth allocating means 11i. Based on these inputs, the reservation information receiving means 11f outputs the received reservation information to the upstream bandwidth allocating means 11i or reservation information delay means 10l. Also, the reservation information receiving means 11f updates the scheduled allocation time information 317 and outputs the same to the upstream resource usage control means 11m.

The upstream bandwidth allocating means 11i, based on the inputted reservation information 312 and 315, allocates an upstream bandwidth to a subscriber and outputs the upstream-bandwidth-grant information 306 to the downstream frame assembly means 10d. Also, the upstream bandwidth allocating means 11i outputs a current allocation time information to the reservation information receiving means 11f. For other parts of the center station and subscriber stations than those described above, the configuration is the same as that of the first embodiment.

FIG. 8 shows a configuration of the upstream resource usage control means 11m of the center station 11 of the second embodiment of the present invention.

The upstream resource usage control means 11m is formed with contracted service quality value memory means 41 and service quality measurement value memory means 51. The contracted service quality value memory means 41 stores an identifier 400, a guaranteed upstream rate 410 and a permissible fluctuation quantity of an allocation time 420. The permissible fluctuation quantity of an allocation time 420 is a reservation quantity accepted temporarily when a subscriber station sends an upstream data at a rate above a previously contracted guaranteed value and designated in a time unit. This sets a permissible fluctuation quantity of an allocation time Tb [sec], supposing that a temporarily acceptable upstream reservation bandwidth is Lb [bits] and a guaranteed upstream rate is g [bps], as $$Tb=Lb/g$$

Also, the service quality measurement value memory means 51 stores the identifier 400 and a scheduled allocation time 520. The scheduled allocation time 520 is calculated and corresponding items are updated when an upstream bandwidth is allocated to a subscriber station in the upstream bandwidth allocating means 11i.

FIG. 9 shows a flowchart of a reservation information receiving processing in the reservation information receiving means 11f of the second embodiment of the present invention.

The reservation information receiving means 11f, upon receiving a reservation information, inputs a current upstream bandwidth allocation time information from the upstream bandwidth allocating means 11i, and obtains a scheduled allocation time information of a service corresponding to an identifier added to the reservation information from the upstream resource usage control means 11m (712). Next, if current upstream bandwidth allocation time is later than a scheduled allocation time (True of 713), the reservation information is outputted to the upstream bandwidth allocating means 11i (715) and an upstream bandwidth is allocated immediately (718). In this case, supposing that a current allocation time is Tc [sec], an allocated upstream bandwidth is B [bits] and a guaranteed upstream rate is g [bps], a scheduled allocation time Tn [see] is updated, as $$Tn=Tc+B/g$$

and outputted to the upstream resource usage control means 11m (720). Also, if the current allocation time Tc is earlier than the scheduled allocation time Tn (False of 713) but later than a time adding the permissible fluctuation quantity of an allocation time Tb to the scheduled allocation time Tn (True of 714), the reservation information is outputted to the upstream bandwidth allocating means 11i (716) and an upstream bandwidth is allocated immediately (719). In this moment, the scheduled allocation time is Tn [sec] is updated, as $$Tn=Tn+B/g$$

and outputted to the upstream resource usage control means 11m (721). Further, if the current time id earlier than a time adding the permissible fluctuation quantity Tb to the scheduled allocation time Tn (False of 714), the reservation information is outputted to the reservation information delay means 10l (717), delaying assignment of the upstream bandwidth. In this case, the scheduled allocation time is not updated.

As described above, since an acceptance method of a reservation is changed by comparing a scheduled allocation time with a current allocation time whether or not a subscriber station is sending an upstream data exceeding a previously contracted guaranteed rate can easily be checked. Also, by setting a permissible fluctuation quantity of an allocation time that can be transmitted exceeding the guaranteed rate, it is possible to Immediately assign an upstream bandwidth if the guaranteed rate is exceeded by a temporary fluctuation in transmission rate of a subscriber station, and give priority to assignment of an upstream bandwidth for another subscriber station, delaying assignment of the upstream bandwidth if the guaranteed rate is exceeded continuously. Thus, according to the present embodiment compared with a method to merely compare a-transmission rate and a guaranteed rate, assignment control of an upstream bandwidth based on an upstream resource usage can be done more flexibly to subscriber stations.

Figure 10:
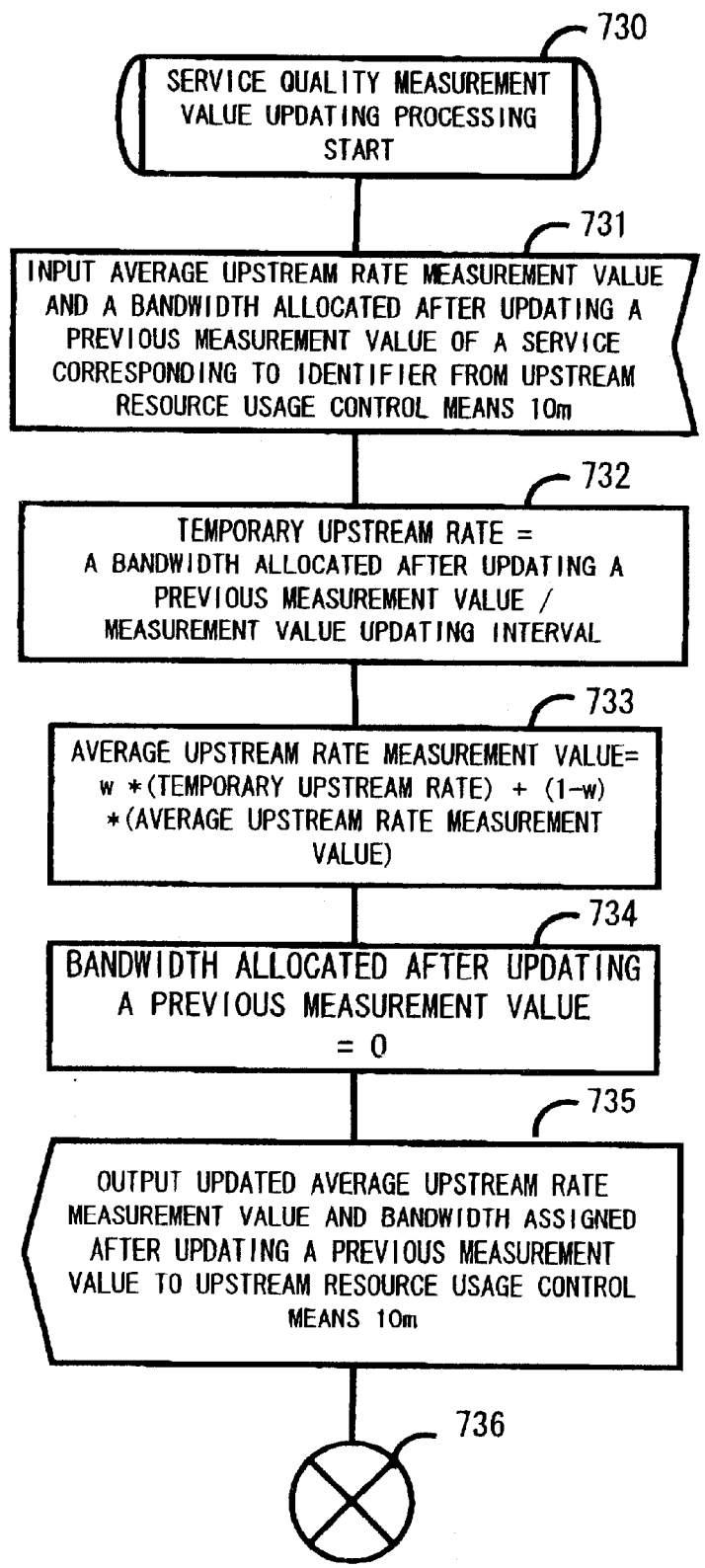
FIG. 10 shows a service quality measurement value updating procedure of upstream resource usage control means 10m in the third embodiment of the present invention.

Next, referring to FIG. 10, description will proceed to a third embodiment of the present invention. For the center station 10 and subscriber station 30, the configuration is the same as that of the first embodiment. FIG. 10 shows a service quality measurement value updating procedure of the upstream resource usage control means 110m in the third embodiment of the present invention.

First, the upstream bandwidth allocating means 10i inputs an average upstream rate measurement value m [bps] and a bandwidth allocated after updating a previous measurement value Ls [bits] of a service corresponding to an identifier from the upstream resource usage control means 10m. Also, the upstream bandwidth allocating means 10i internally controls a measurement value updating interval Ti [sec]. The upstream bandwidth allocating means 10i calculates a temporary upstream rate r [bps] up to the present after updating a previous measurement value from these values, as $$r=Ls/Ti$$

Then, it updates the average upstream rate measurement value m [bps], as follows.

$$m = w*r + (1-w)*m$$

Here w is a weighting average index, and a value between 0 and 1 is designated. An influence of a previous measurement value remains at time updating an average upstream rate measurement value if a value w is closer to 0, and the influence of the previous measurement value remains less if the value w is closer to 1.

Next, the previous measurement value Ls is updated to 0 and the time updating a previous measurement value Ts to a current time, and these are outputted to the upstream resource usage control means 10m together with an average upstream rate measurement value.

Like this, by updating an average upstream rate measurement value by taking a weighting average of temporary upstream rate measurement values, an influence of an average upstream rate before updating a measurement value remains. Accordingly, an upstream service quality can be guaranteed without immediately delaying acceptance of a reservation even when the upstream service quality frequently exceeds a guaranteed value due to sudden fluctuations in traffic.

Referring now to FIGS. 11 through 14, description will proceed to a fourth embodiment of the present invention.

Figure 11:
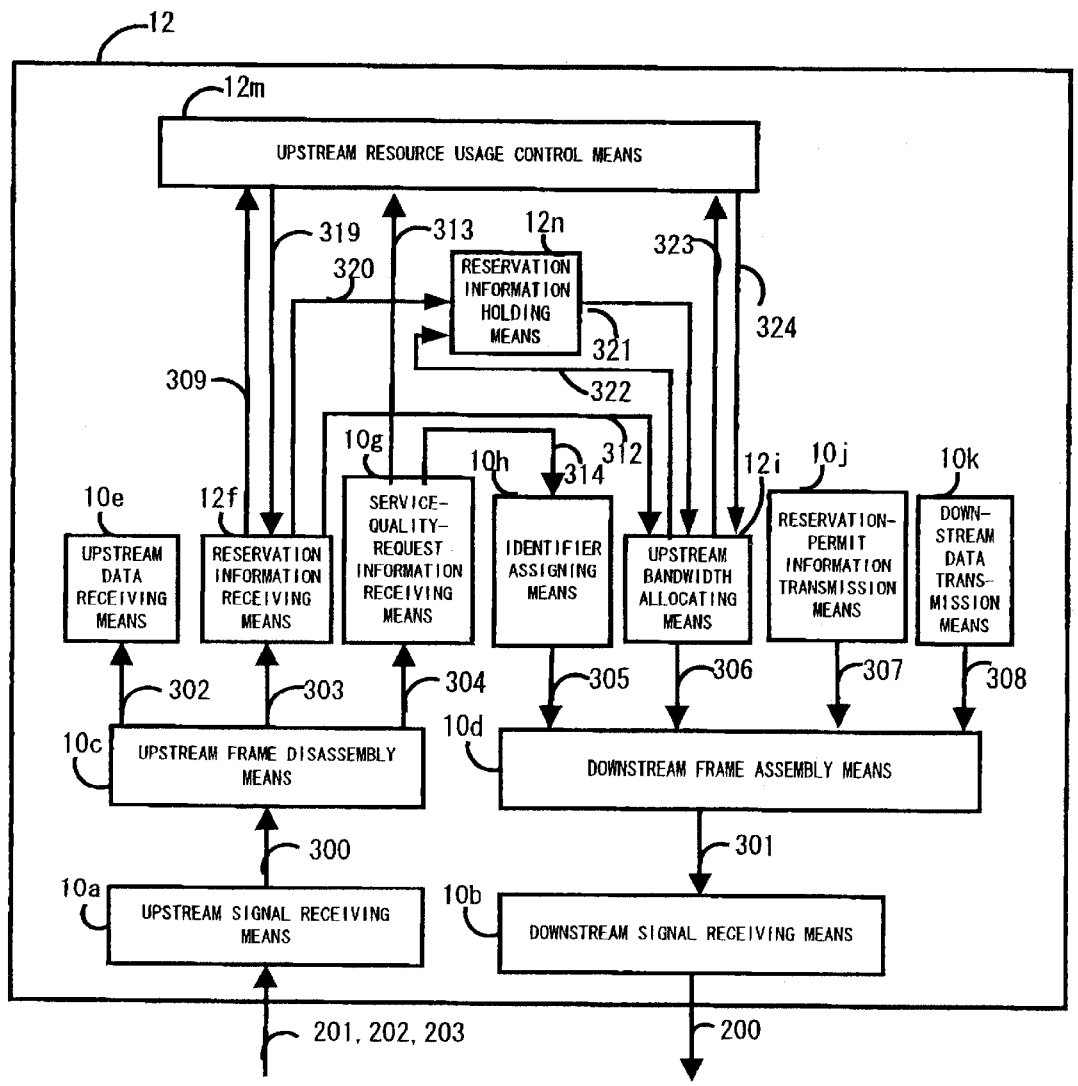
FIG. 11 shows a configuration of a center station 12 in a fourth embodiment of the present invention.

FIG. 11 shows a configuration of a center station 12 in a fourth embodiment of the present invention.

Reservation information receiving means 12 of the center station 12, upon receiving a reservation information from a subscriber station, inputs a priority information 319 corresponding to an identifier information 309 added to the reservation information from upstream resource usage control means 12m. Then, the reservation information receiving means 12f inserts a reservation information 320 to reservation information holding means 12n based on the priority information 319. The reservation information holding means 12n holds the inputted reservation information at queues of each priority.

Upstream bandwidth allocating means 12i removes a reservation information occasionally from the head of a reservation information queue of a highest priority. In this case, if a measured value of an average upstream rate of a service corresponding to an identifier of the taken reservation information is within a previously contracted guarantee rate, the reservation is immediately accepted and an upstream bandwidth is allocated, and if the measured value exceeds the guaranteed value, the removed reservation information is inserted to an end of a queue which is lower in priority and acceptance of the reservation is delayed.

FIG. 12 shows the upstream resource usage control means 12m in the fourth embodiment of the present invention.

Service quality application value memory means 42 of the upstream resource usage control means 12m, in addition to controlling the identifier 400 and guaranteed upstream rate 410 for each service, holds a priority 430. For the service quality measurement value memory means 50, the form is the same as the first embodiment.

Figure 13:
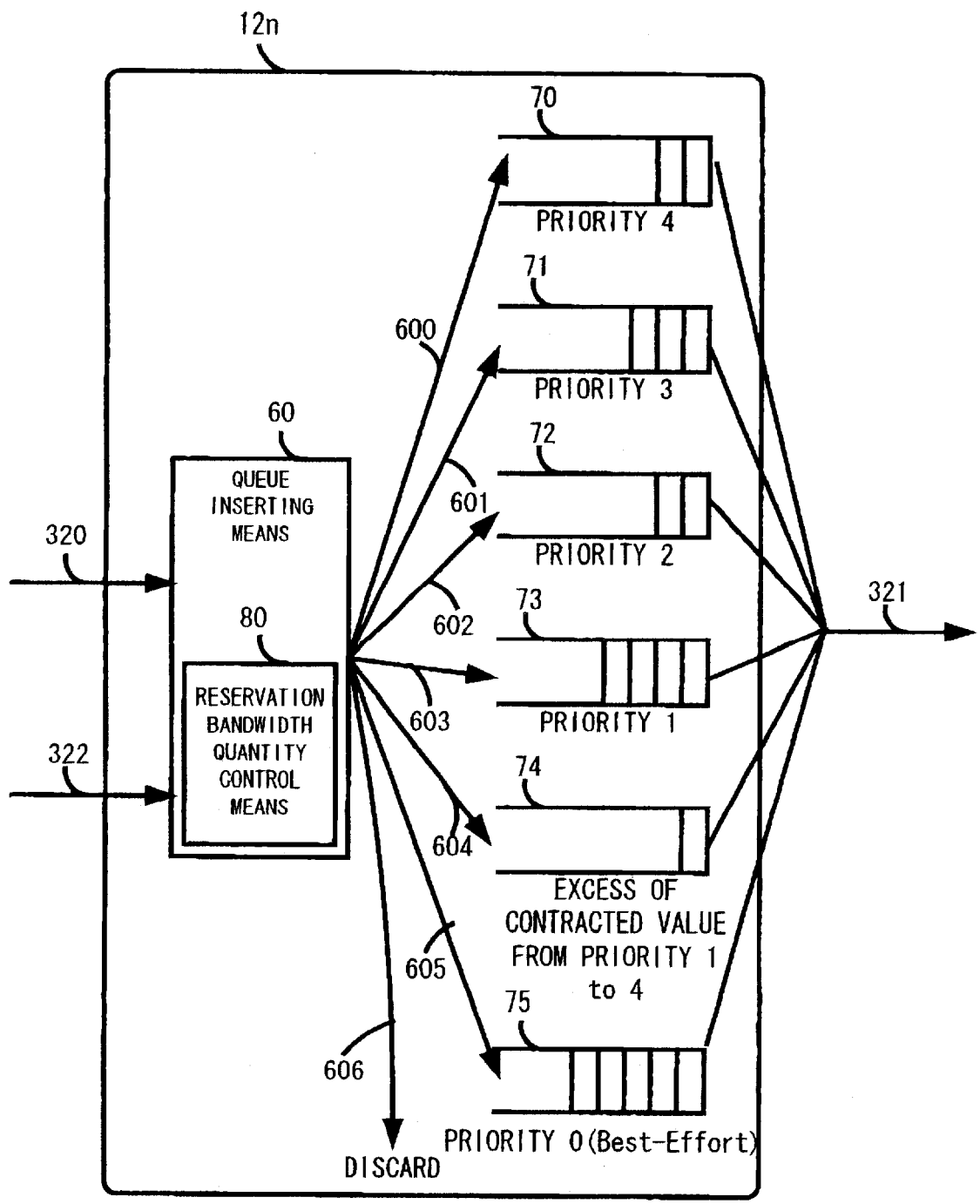
FIG. 13 shows a configuration of reservation information holding means 12n in the fourth embodiment.

FIG. 13 shows a configuration of the reservation information holding means 12n in the fourth embodiment of the present invention.

The reservation information holding means 12n is formed with queue inserting means 60 and reservation information queues 70, 71, 72, 73, 74 and 75. The queue inserting means 60 selects a reservation information corresponding to a priority of an input reservation information 320 or 322 and outputs a reservation information. Also, the queue inserting means 60, having reservation bandwidth quantity control means 80 inside, judges whether or not a received reservation information to a reservation information queue, and if not, discards the reservation information.

The reservation information queue 70 holds a reservation information of priority 4, the reservation information queue 71 holds that of priority 3, the reservation information queue 72 holds that of priority 2, the reservation information queue 73 holds that of priority 1 and the reservation information queue 75 holds that of priority 1. For the priority order, priority 4 is the highest and priority 0 is the lowest, and priority 0 corresponds to a best-effort traffic. Also, the reservation information queue 74 holds, out of reservation information of priorities 4 to 1 taken out by the upstream bandwidth allocating means 12i, a reservation information that is reinserted because a measurement value of an upstream service quality exceeds a previously contracted guaranteed value.

Like this, by a center station holding a queue corresponding to a priority that temporarily holds a reservation information, it is possible to easily delay acceptance of a reservation of a subscriber station that send upstream data exceeding a service quality and give priority to acceptance of a reservation of another subscriber station.

FIG. 14 shows a configuration of the reservation bandwidth quantity control means 80 in the fourth embodiment of the present invention.

The reservation bandwidth quantity control means 80 controls a total quantity of holding reservation bandwidths 91 that are available for holding and an upper limit of a holdable reservation bandwidth 92 for each reservation information queue number 90. These indicate a total of upstream bandwidths reserved by each reservation information contained in queues and its upper limit value.

The queue inserting means 60, upon a new reservation information being inserted, adds an requested bandwidth to the sum of requested upstream bandwidth held in the queue 91 of a corresponding priority, and if the result of addition is below the upper limit of sum of requested upstream bandwidth held in the queue 92, inserts the reservation information to a corresponding queue and updates the sum of requested upstream bandwidth held in the queue 91.

If the result of addition exceeds the upper limit of sum of requested upstream bandwidth held in the queue 92, the inputted reservation information is discarded and the total quantity of holding reservation bandwidths 91 is not updated.

Also, if a reservation information is removed from a reservation information queue by the upstream bandwidth allocating means 12i, out of a sum of requested upstream bandwidth held in the queue, a requested upstream bandwidth portion of the taken reservation information is subtracted. In this case, supposing an upper limit of a holdable reservation bandwidth Lu [bit] and an upstream physical rate Ru [bps], an upper limit value of queuing delay Tq [sec] of reservation information is determined, as $$Tq = Lu/Ru$$

Thus, an upper limit of a delay time required for reservation information queuing can be guaranteed for each priority.

As described above, according to the present invention, in a multiple-access communication system where a center station dynamically allocates bandwidths of an upstream channel to subscriber stations, it is possible to measure and guarantee a service quality supplied for each service permitted to subscriber stations. In particular, it is possible to prevent a degradation in service quality for other subscriber stations sending upstream data within a guaranteed value by delaying a reservation of a subscriber station that sends upstream data exceeding a guaranteed is value of a service quality so as to give priority to reservations of the other subscriber stations. For example, it is possible to prevent a degradation in service quality for other subscriber stations due to an influence of a subscriber station that sends upstream data exceeding a transmission rate or a burst length as a previously contracted guaranteed value of a service quality. Further effects of the present invention described in claim 2 and on are as follows.

In the second invention in which a center station compares a scheduled allocation time of an upstream bandwidth for each service and a current allocation time at a center station, the center station can control whether or not a subscriber station is sending upstream data exceeding a guaranteed value of a service quality.

In the third invention in which a center station decides updating of a scheduled allocation time and a method of accepting a reservation by comparing a current allocation time and a scheduled allocation time, the center station immediately accepts a reservation information while a subscriber station is sending within a previously contracted upstream rate or by temporarily exceeding the upstream rate, or if the subscriber station continuously exceeds a previously contracted upstream rate for more than a certain period of time, it is possible to accept a reservation information of another subscriber station prior to accepting of the received reservation information.

In the fourth invention in which a center station takes statistics of a measured upstream service quality, an upstream service quality can be guaranteed without immediately delaying acceptance of a reservation even when the upstream service quality frequently exceeds a guaranteed value due to sudden fluctuations in traffic.

In the fifth invention in which an average upstream rate for an upstream service is taken statistically from a weighting average, an upstream service quality can be guaranteed without immediately delaying acceptance of a reservation even when the upstream service quality frequently exceeds a guaranteed value due to sudden fluctuations in traffic.

In the sixth invention in which upstream channel is divided in a slot unit, besides the advantage mentioned above, assignment of an upstream bandwidth and measurement of an upstream service quality can easily be done.

In the seventh invention that allows a center station to have queues corresponding to priorities of temporarily holding reservation information, it is possible to delay acceptance of a reservation of a subscriber station that sends an upstream data exceeding a service quality and accept a reservation of other subscriber stations prior to the received reservation information, so as to prevent degradation of service quality to the other subscriber stations.

In the eighth invention in which a center station holds a total of upstream bandwidths reserved by reservation information contained in queues each of priorities and adds reservation information to the queues by comparing the result with a previously set upper limit, it is possible to guarantee an upper limit of a delay time required for queuing for each priority.

While the present invention has thus far been described in conjunction with only several embodiments thereof, it will now be readily possible for those skilled in the art to put this invention into various other manners.

What is claimed is:

1. A multiple-access communication system comprising;

a center station;

a subscriber station;

a broadcasting downstream channel; and a multiple-access type upstream channel from the subscriber station to the center station, in which the center station permits the subscriber station to use guaranteed services of different qualities and assigns identifiers for each service to the subscriber station, and the subscriber station having an upstream data to send transmits reservation information made up of the identifier and an upstream bandwidth to request in a bandwidth permitted by the center station, and the center station allocates upstream bandwidth to the subscriber based on the reservation information received from the subscriber station, wherein said center station, upon receiving said reservation information from said subscriber station, measures a service quality being supplied with regard to said identifier contained in said reservation information and compares a measured value with a guaranteed value of a previously assigned service quality, and if the measured value is below the guaranteed value, the center station immediately accepts said reservation information and allocates upstream bandwidth, and if the measured value is above the guaranteed value, the center station accepts a reservation information of other subscriber stations prior to accepting said reservation information, so as to prevent degradation of service quality to the other subscriber stations and reassure each quality of service to all said subscribers.

2. A multiple-access communication system as claimed in claim 1, wherein said center station holds, for each service it permitted to said subscriber station, a scheduled allocation time information determined from a guaranteed service quality and an reserved upstream bandwidth, and a permissible fluctuation quantity information of an allocation time when a current allocation time is earlier than a scheduled allocation time, and said center station, upon receiving said reservation information from said subscriber station, compares the current allocation time and the scheduled allocation time and, if the current allocation time is later than the scheduled allocation time, or if the current allocation time is earlier than the scheduled allocation time but later than a time adding the permissible fluctuation quantity of the allocation time to the scheduled allocation time, the center station immediately accepts said reservation information and allocates upstream bandwidth, and if the current allocation time is earlier than the time adding the permissible fluctuation quantity of the allocation time to the scheduled allocation time, the center station accepts reservation information of other subscriber stations prior to accepting said reservation information, so as to prevent degradation of service quality to the other subscriber stations.

3. A multiple-access communication system as claimed in claim 2, wherein supposing that an upstream rate which said center station guarantees said subscriber station is g bits/sec, a permissible fluctuation quantity of an allocation time is Tb seconds and the requested upstream bandwidth in said reservation information which said center station receives from said subscriber station is B bits, if the current allocation time is later than the scheduled allocation time, the center station immediately accepts said reservation information and updates the scheduled allocation time to a value adding (B/g) seconds to the current allocation time, or if the current allocation time is earlier than the scheduled allocation time but later than a time adding Tb to the scheduled allocation time, the center station immediately accepts said reservation information and updates the scheduled allocation time to a value adding (B/g) seconds to the scheduled allocation time, and, if the current allocation time is earlier than the time adding Tb to the scheduled allocation time, the center station does not update the scheduled allocation time and accepts reservation information of other subscriber stations prior to accepting said reservation information, so as to prevent degradation of service quality to the other subscriber stations.

4. A multiple-access communication system as claimed in claim 1, wherein said center station, when measuring a service quality being supplied for each service it permitted to said subscriber station, updates a statistical value of service quality from statistical values of service quality measured in the past and temporary values of service quality measured up to the present after updating a previous statistical value, and, if the statistical value of service quality is below a guaranteed value of a previously assigned service quality when receiving an upstream reservation information, the center station immediately accepts said reservation information and allocates upstream bandwidth, and if the statistical value of service quality exceeds the guaranteed value of the service quality, the center station accepts reservation information of other subscriber stations prior to accepting said reservation information, so as to prevent degradation of service quality to the other subscriber stations.

5. A multiple-access communication system as claimed in claim 4, wherein supposing that an interval of measuring a service quality being supplied for each service is Ti seconds, an upstream rate guaranteed to said subscriber station is g bits/sec, a statistical value of an average upstream rate for an upstream service is m bits/sec, a temporary upstream rate up to the present after updating a previous statistical value is r bits/sec, and a weighting average index is w, w being values between 0 and 1, the center station, when measuring a service quality, updates a value of the statistical value m of upstream rate to $w*r+(1-w)*m$, and if m is below g when receiving upstream-bandwidth-request information, the center station immediately accepts said upstream-bandwidth-request information and allocates the upstream bandwidth, and if m is above g, the center station accepts reservation information of other subscriber stations prior to accepting said reservation information, so as to prevent degradation of service quality to the other subscriber stations.

6. A multiple-access communication system as claimed in claim 5, wherein said center station and said subscriber station divide an upstream channel into slots of ten and some bytes and up to some ten bytes, make reservation and allocate upstream bandwidth in a unit of said slot.

7. A multiple-access communication system as claimed in claim 6, wherein said center station assigns a priority for each service it permitted to said subscriber station and has queues to temporarily hold reservation information received for each priority, and when receiving said reservation information from said subscriber station, the center station inserts said reservation information to an tail of a queue of a priority corresponding to said identifier in the said reservation information and, when allocating the upstream bandwidth, the center station removes said reservation information from the head of the queue of a highest priority and compares a measured value of a service quality corresponding to said identifier of said reservation information with a guaranteed value of a previously assigned service quality, and, if the measured value is below the guaranteed value, the center station immediately accepts the reservation and allocates the upstream bandwidth, or if the measured value is above the guaranteed value, the center station inserts the reservation information to the tail of the queue of a lower priority, so as to prevent degradation of service quality to another subscriber station.

8. A multiple-access communication system as claimed in claim 7, wherein said center station holds the sum of requested upstream bandwidth contained in each reservation information in a queue for each priority, and, receiving a reservation information from said subscriber station, adds requested upstream bandwidth contained in the received reservation information to the current sum of requested upstream bandwidth, and, if the result is below a previously set upper limit of the sum of requested upstream bandwidth which each queue can hold, the center station inserts the received reservation information to a queue corresponding to a priority of said identifier in the said reservation information, and if the result exceeds the upper limit, the center station inserts the said reservation information to a queue of a lower priority.

* * * * *